US008272037B2

United States Patent
Zhang et al.

(10) Patent No.: US 8,272,037 B2
(45) Date of Patent: Sep. 18, 2012

(54) FLEXIBLE WLAN ACCESS POINT ARCHITECTURE CAPABLE OF ACCOMMODATING DIFFERENT USER DEVICES

(75) Inventors: Junbiao Zhang, Bridgewater, NJ (US); Saurabh Mathur, Plainsboro, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1769 days.

(21) Appl. No.: 10/549,465

(22) PCT Filed: Mar. 12, 2004

(86) PCT No.: PCT/US2004/007805
§ 371 (c)(1),
(2), (4) Date: Sep. 14, 2005

(87) PCT Pub. No.: WO2004/084464
PCT Pub. Date: Sep. 30, 2004

(65) Prior Publication Data
US 2006/0179475 A1 Aug. 10, 2006

Related U.S. Application Data

(60) Provisional application No. 60/454,558, filed on Mar. 14, 2003.

(51) Int. Cl.
*H04L 29/06* (2006.01)
(52) U.S. Cl. ............ 726/3; 726/2; 726/4; 726/5; 726/6; 713/168; 713/150; 409/225; 409/227; 409/229; 409/230; 455/426.2; 455/411; 370/395.5; 370/310; 370/466; 370/469

(58) Field of Classification Search ....................... None
See application file for complete search history.

(56) References Cited

U.S. PATENT DOCUMENTS

| 5,347,524 A | * | 9/1994 | I'Anson et al. ................. 714/39 |
| 5,784,566 A |   | 7/1998 | Viavant et al. |
| 6,038,400 A | * | 3/2000 | Bell et al. ........................ 710/11 |

(Continued)

FOREIGN PATENT DOCUMENTS

EP 0998094 5/2000

(Continued)

OTHER PUBLICATIONS

Search Report Dated Aug. 31, 2004.

(Continued)

*Primary Examiner* — Syed A. Zia
(74) *Attorney, Agent, or Firm* — Robert D. Shedd; Jeffrey M. Navon; Jerome G. Schaefer

(57) ABSTRACT

The invention provides an apparatus and a method for improving the control of access by a terminal device in a WLAN environment having an access point for determining whether the device utilizes an IEEE 802.1x protocol by the access point communicating to the device, a packet, whereby if the devices utilizes a IEEE 802.1x protocol the device appropriately responds and otherwise the access point determines that the terminal device protocol does not employ a IEEE 802.1x protocol and selects an authentication mechanism compatible with the terminal device. If the device is not an IEEE 802.1x client, an IP packet filtering is configured to redirect a user HTTP request to a local server, and when the HTTP requests are thereby redirected, the HTTP server presents the terminal device with information specifically related to the browser based authentication.

20 Claims, 3 Drawing Sheets

U.S. PATENT DOCUMENTS

| | | | | |
|---|---|---|---|---|
| 6,259,675 | B1* | 7/2001 | Honda | 370/248 |
| 6,400,696 | B1* | 6/2002 | Hreha | 370/316 |
| 6,510,236 | B1* | 1/2003 | Crane et al. | 382/116 |
| 6,600,726 | B1* | 7/2003 | Nevo et al. | 370/278 |
| 6,611,231 | B2* | 8/2003 | Crilly et al. | 342/378 |
| 6,732,176 | B1* | 5/2004 | Stewart et al. | 709/227 |
| 6,965,674 | B2* | 11/2005 | Whelan et al. | 380/270 |
| 6,965,816 | B2* | 11/2005 | Walker | 701/16 |
| 6,970,682 | B2* | 11/2005 | Crilly et al. | 455/78 |
| 7,035,932 | B1* | 4/2006 | Dowling | 709/230 |
| 7,039,021 | B1* | 5/2006 | Kokudo | 370/310 |
| 7,092,943 | B2* | 8/2006 | Roese et al. | 707/9 |
| 7,116,970 | B2* | 10/2006 | Brusilovsky et al. | 455/411 |
| 7,133,526 | B2* | 11/2006 | Whelan et al. | 380/270 |
| 7,164,663 | B2* | 1/2007 | Frank et al. | 370/328 |
| 7,200,112 | B2* | 4/2007 | Sundar et al. | 370/230 |
| 7,203,463 | B2* | 4/2007 | Bahl et al. | 455/68 |
| 7,215,660 | B2* | 5/2007 | Perlman | 370/338 |
| 7,277,404 | B2* | 10/2007 | Tanzella et al. | 370/310 |
| 7,289,465 | B2* | 10/2007 | Kuan et al. | 370/328 |
| 7,295,556 | B2* | 11/2007 | Roese et al. | 370/395.3 |
| 7,325,246 | B1* | 1/2008 | Halasz et al. | 726/2 |
| 7,350,076 | B1* | 3/2008 | Young et al. | 713/169 |
| 7,350,077 | B2* | 3/2008 | Meier et al. | 713/171 |
| 7,353,533 | B2* | 4/2008 | Wright et al. | 726/1 |
| 7,424,605 | B2* | 9/2008 | Arai | 713/151 |
| 7,478,420 | B2* | 1/2009 | Wright et al. | 726/1 |
| 7,483,411 | B2* | 1/2009 | Weinstein et al. | 370/338 |
| 7,483,984 | B1* | 1/2009 | Jonker et al. | 709/226 |
| 7,499,401 | B2* | 3/2009 | Buddhikot et al. | 370/235 |
| 7,512,081 | B2* | 3/2009 | Ayyagari et al. | 370/255 |
| 7,526,800 | B2* | 4/2009 | Wright et al. | 726/11 |
| 7,633,909 | B1* | 12/2009 | Jones et al. | 370/338 |
| 7,712,128 | B2* | 5/2010 | Porozni et al. | 726/5 |
| 7,769,898 | B2* | 8/2010 | Morinaga | 709/246 |
| 8,103,278 | B2* | 1/2012 | Tsao | 455/442 |
| 8,104,072 | B2* | 1/2012 | Rohilla et al. | 726/4 |
| 8,170,032 | B2* | 5/2012 | Mohri et al. | 370/395.52 |
| 8,218,516 | B1* | 7/2012 | Donovan et al. | 370/338 |
| 2002/0061031 | A1* | 5/2002 | Sugar et al. | 370/466 |
| 2003/0008662 | A1 | 1/2003 | Stern et al. | |
| 2003/0054846 | A1* | 3/2003 | Parry | 455/517 |
| 2003/0083080 | A1* | 5/2003 | Fournier et al. | 455/466 |
| 2003/0120809 | A1* | 6/2003 | Bellur et al. | 709/239 |
| 2003/0202494 | A1* | 10/2003 | Drews et al. | 370/338 |
| 2003/0219033 | A1* | 11/2003 | Silvester | 370/469 |
| 2004/0203872 | A1* | 10/2004 | Bajikar | 455/456.1 |
| 2004/0208151 | A1* | 10/2004 | Haverinen et al. | 370/338 |
| 2005/0177515 | A1* | 8/2005 | Kalavade et al. | 705/52 |
| 2006/0075073 | A1* | 4/2006 | Bichot | 709/220 |
| 2006/0259768 | A1* | 11/2006 | Chow | 713/168 |
| 2011/0211219 | A1* | 9/2011 | Bradley et al. | 358/1.15 |
| 2011/0280331 | A1* | 11/2011 | Hansen et al. | 375/267 |
| 2012/0178431 | A1* | 7/2012 | Gold | 455/420 |

FOREIGN PATENT DOCUMENTS

| | | |
|---|---|---|
| EP | 998094 A2 * | 5/2000 |
| EP | 1265420 | 12/2002 |
| EP | 1265420 A2 * | 12/2002 |
| EP | 1298952 A2 * | 4/2003 |
| EP | 1330073 A1 * | 7/2003 |
| JP | 05-292147 A | 11/1993 |
| JP | 07-235950 A | 9/1995 |
| JP | 11-017770 A | 1/1999 |
| JP | 11-313371 A | 11/1999 |
| JP | 2000261461 A | 9/2000 |
| JP | 2001-086563 A | 3/2001 |
| JP | 2001-111544 A | 4/2001 |
| WO | 02/11391 A2 | 2/2002 |
| WO | WO 02/100062 | 12/2002 |
| WO | WO 02/100062 A2 * | 12/2002 |

OTHER PUBLICATIONS

Hidetoshi Yokoya, A Study on IP Mobility Service Provisioning in Cooperation With IEEE 802.1X Authentication:, Proceedings of the 2002 Communications Society Conference of IEICE, Japan, Aug. 20, 2002, pp. 527-528.

Chung et al., "Technology Trend on Authentication and Key Management in Public WLAN Network", Trend Analysis of Electronic Communication Trend, vol. 17, No. 4, Aug. 2002. English translation.

Chung et al., "Technology Trend on Authentication and Key Management in Public WLAN Network", Trend Analysis of Electronic Communication Trend, vol. 17, No. 4, Aug. 2002. English Translation to follow.

Dierks et al., "The TLS Protocol Version 1.0, Request for Comments: 2246", Internet Citation: http://www.ietf.org/rfc/rfc2246.txt, Jan. 1999.

Ryuta Mgi, "Solution of Wireless LAN security for coping with uprising risks of eavesdropping and unauthorized access" Nikkei Windows for IT Professionals, No. 71, pp. 74-81, Special Issue Feb. 2, 2003 Original & Translation.

Masahide Saito, "Tips for system design and switch operation for protecting the inside, Protect the company's security with switches", N+1 Network Guide, vol. 2, No. 10, Japan, Softbank Publishing, Oct. 1, 2002, pp. 70-80 Original & Translation.

* cited by examiner

000
FLEXIBLE WLAN ACCESS POINT ARCHITECTURE CAPABLE OF ACCOMMODATING DIFFERENT USER DEVICES

RELATED APPLICATION

This application claims the benefit, under 35 U.S.C. §365 of International Application PCT/US04/07805, filed Mar. 12, 2004, which was published in accordance with PCT Article 21(2) on Sep. 30, 2004 in English and which claims the benefit of U.S. provisional patent application No. 60/454,558, filed Mar. 14, 2003.

FIELD OF THE INVENTION

The invention provides an apparatus and a method controlling access by a user terminal to a communications network, and in particular, an apparatus and a method for controlling access by a mobile terminal to a WLAN by accommodating for each mobile terminal its particular capabilities and selecting accordingly, the optimum available authentication mechanism.

DESCRIPTION OF RELATED ART

The context of the present invention is the family of wireless local area networks or (WLAN) employing the IEEE 802.1x architecture having an access point that provides access for mobile devices and to other networks, such as hard d wired local area and global networks, such as the Internet. Advancements in WLAN technology have resulted in the publicly accessible at rest stops, cafes, libraries and similar public facilities ("hot spots"). Presently, public WLANs offer mobile communication device users access to a private data network, such as a corporate intranet, or a public data network such as the Internet, peer-to-peer communication and live wireless TV broadcasting. The relatively low cost to implement and operate a public WLAN, as well as the available high bandwidth (usually in excess of 10 Megabits/second) makes the public WLAN an ideal access mechanism through which mobile wireless communications device users can exchange packets with an external entity, however as will be discussed below, such open deployment may compromise security unless adequate means for identification and authentication exists.

When a user operating a terminal incorporating the IEEE 802.1x protocol ("client terminal" or simply "IEEE 802.1x client") attempts to access a public WLAN at a hot spot, the IEEE 802.1x client terminal would begin the authentication process according to its current machine configuration. After authentication, the public WLAN opens a secure data channel to the mobile communications device to protect the privacy of data passing between the WLAN and the device. Presently, many manufacturers of WLAN equipment have adopted the IEEE 802.1x protocol for deployed equipment. However, other devices utilizing WLAN may use other protocols such as may be provided by wired electronic privacy (WEP). Notably, the predominant authentication mechanism for WLAN utilizes the IEEE 802.1x protocol. Unfortunately, the IEEE 802.1x protocol was designed with private LAN access as its usage model. Hence, the IEEE 802.1x protocol does not provide certain convenient features necessary in a public WLAN environment. A further problem with the current predominant standard is that it requires IEEE 802.1x protocol client software installation and configuration. In addition, the IEEE 802.1x protocol does not have a sophisticated mechanism for interacting with the user. The access point can only send simple messages to the client via electronic access point (EAP) notification. This may be sufficient for an enterprise setting, but in a hot spot the access point might require that the user accept an end user license before permitting access. In some instances, the access point needs to inform the user about service charges. One solution would be to provide the access point the capability to interact with the users via the web browser interface.

Most existing WLAN hot spot wireless providers use a web browser based solution for user authentication and access control offering convenience to the user that does not require any software download on the user device. As illustrated in FIG. 1, the relationships among primary entities typically involved in an authentication in a public WLAN environment are a mobile terminal (MT), a WLAN access point (AP), a local server and an authentication server (AS). In the web based solution, the user is securely authenticated through HTTPS by the AS, which in turn notifies the AP to grant access to the MT. The WLAN operator may own such an authorization server or any third party providers, such as Independent Service Providers (ISPs), pre-paid card providers or cellular operators, referred to more broadly as virtual operators. A public WLAN hot spot, therefore, should accommodate such different client and operator capabilities, based on which, the WLAN should have the ability to select different authentication mechanisms. The prior art has not sufficiently addressed means that would provide such capabilities, however, the invention described herein, provides a novel solution.

SUMMARY OF THE INVENTION

What is desired is an apparatus and a method for improving the security, or control of access by a user terminal, to a communications network, in particular the control of access by a mobile terminal to a wireless local area network.

The invention provides a method for controlling the access by a terminal device by determining the type of authentication protocol associated with the terminal device and automatically routing the authentication request to the appropriate authentication server. Specifically, the invention herein provides a method for controlling the access of a terminal device in a WLAN environment by determining whether a terminal device utilizes an IEEE 802.1x protocol, comprising the steps of an access point communicating to the mobile terminal a request to identify, and if the mobile terminal utilizes an IEEE 802.1x protocol acknowledging the request to identify, otherwise the access point determines that the mobile terminal does not employ a IEEE 802.1x protocol and therefore selects an authentication mechanism compatible with the mobile terminal.

If the terminal device is not IEEE 802.1x compliant the access point initiates a state in the access point that indicates the terminal is a non-IEEE 802.1x protocol and configures an IP packet filter and redirects a user HTTP request to a local server. The process of the present invention may also communicate from the local server to the terminal device information specifically related to a browser-based authentication. If the device utilizes the IEEE 802.1x protocol, the access point transitions to a state that indicates that the mobile terminal is IEEE 802.1x compliant and thereafter processes all further communication utilizing the IEEE 802.1x protocol. In the event that the authentication process fails, then one embodiment of the present invention initiates in the access point, a failure condition.

One embodiment of the invention for improving the security of a terminal device in a WLAN environment utilizes the access point for determining whether the device utilizes an IEEE 802.1x protocol, by having the access point communicate to the terminal device a Request-Identity EAP packet, whereby if the devices utilizes a IEEE 802.1x protocol the device responds with a Response-Identity EAP packet and otherwise the access point determines that the mobile terminal protocol does not employ a IEEE 802.1x protocol (e.g. based on timeout) and selects an authentication mechanism compatible with the mobile terminal.

The invention for improving the security of a terminal device in a WLAN environment also includes an apparatus comprised of an access point in communication with a terminal device in a WLAN environment utilizing a means to determine whether the terminal device utilizes an IEEE 802.1x protocol and if the terminal does not utilize said protocol then the access point employs an authentication means compatible with the terminal device otherwise the access point employs an IEEE 802.1x protocol. The access point means to determine includes communicating to the terminal device a Request-Identity EAP packet and if the mobile terminal utilizes the IEEE 802.1x protocol the access receives a Response-Identity EAP packet. The access point further comprises the means to configure an IP packet filtering to redirect the device HTTP request to a local server if the terminal device does not utilize said protocol.

In a further embodiment of the apparatus, the access point includes a means to communicate IEEE 802.1x protocol exchanges and means to establish IP packet filtering through an IP filter module and state information for the HTTP server to control the terminal device access during and after IEEE 802.1x based authentication process if the access point detects that the terminal device is an IEEE 802.1x client.

BRIEF DESCRIPTION OF THE DRAWINGS

The invention is best understood from the following detailed description when read in connection with the accompanying drawing. The various features of the drawings are not specified exhaustively. On the contrary, the various features may be arbitrarily expanded or reduced for clarity. Included in the drawing are the following figures.

DETAILED DESCRIPTION OF THE INVENTION

In the figures to be discussed the circuits and associated blocks and arrows represent functions of the process according to the present invention, which may be implemented as electrical circuits and associated wires or data busses, that transport electrical signals. Alternatively, one or more associated arrows may represent communication (e.g., data flow) between software routines, particularly when the present method or apparatus of the present invention is implemented as a digital process.

Figure 1:
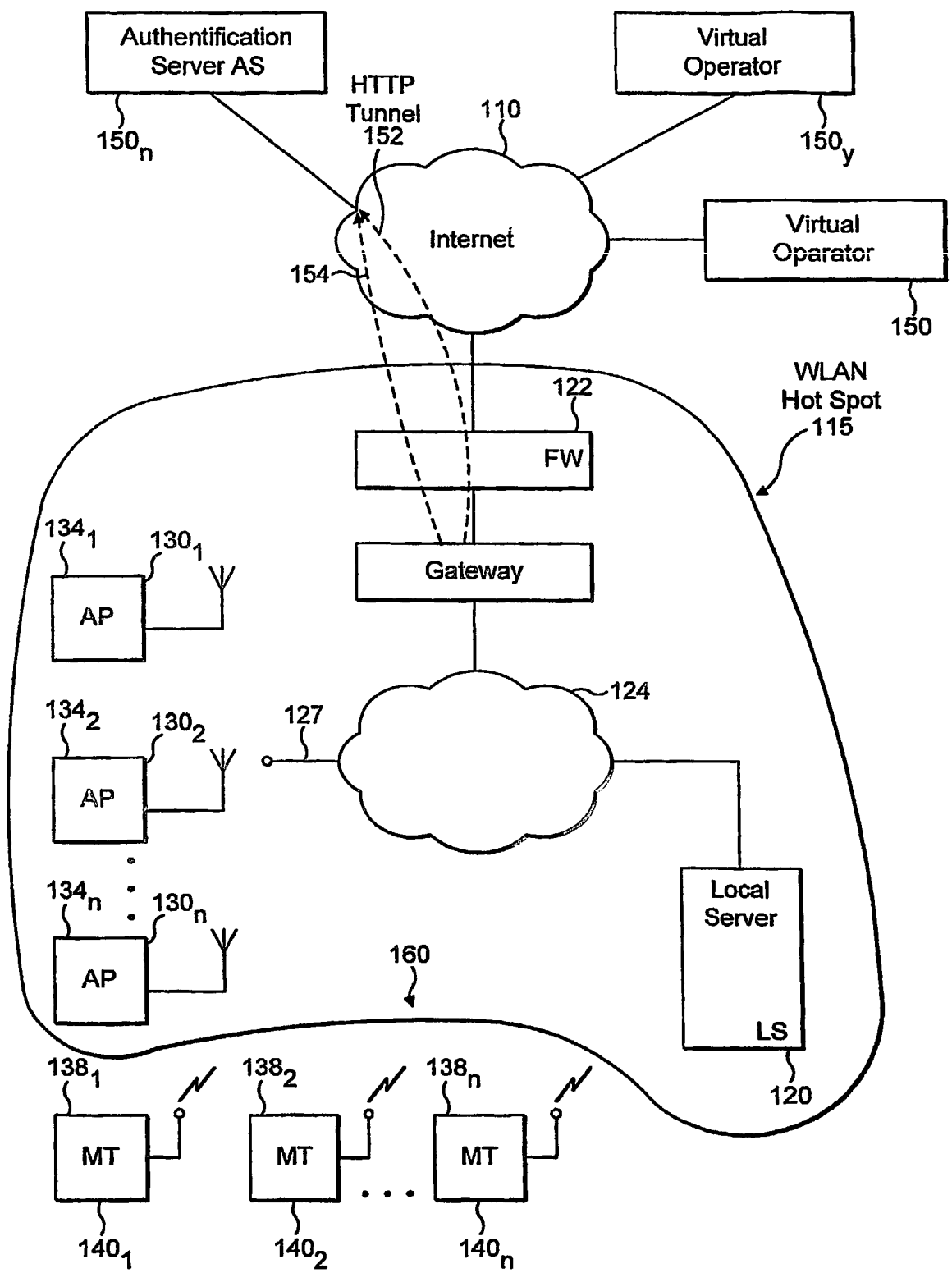
FIG. 1 is a block diagram of a communications system for practicing the method of the present invention for improving the security of a terminal device in a WLAN environment.

In accordance with FIG. 1, one or more mobile terminals represented by $140_1$ through $140_n$ communicate through an access point (AP) through $130_n$, local computer 120, in association with firewalls 122 and one or more virtual operators $150_{1-n}$, such as authentication server $150_n$. Communication from terminals $140_{1-n}$ typically require accessing a secured data base or other resources, utilizing the Internet 110 and associated communication paths 154 and 152 that require a high degree of security from unauthorized entities, such as would be hackers.

As further illustrated in FIG. 1, the WLAN architecture encompasses several components and services that interact to provide station mobility transparent to the higher layers of a network stack. The AP stations such as access points $130_{1-n}$ and mobile terminals $140_{1-n}$ as the components connect to the wireless medium and typically contain the functionality of the IEEE 802.1x protocols, that being MAC (Medium Access Control) $134_{1-n}$, and corresponding PHY (Physical Layer) (unshown), and a connection 127 to the wireless media. Communication functions and protocols are implemented in the hardware and software of a wireless modem or a network access or interface card. This invention proposes a method for implementing a means in the communication stream such that an access point $130_n$ improves the security of a terminal device in a WLAN environment 115 whether the device utilizes an IEEE 802.1x protocol or not and remain within the compatibility requirements of a IEEE 802.1x WLAN MAC layers for downlink traffic (e.g. from the an authentication server 150 to the mobile terminal $140_n$ such as a laptop) as each may participate in the authentication of one or more wireless mobile devices $140_{1-n}$, a local server 120 and a virtual operator such as the authentication server 150.

In accordance with the present principles of the invention, an access 160 enables each mobile terminals $140_{1-n}$, to securely access a WLAN 115 by authenticating the mobile terminal $140_{1-n}$ as well as its communication stream in accordance with the IEEE 802.1x protocol or other optional protocol as the specific terminal $140_{1-n}$ may choose. The manner in which the access 160 enables such secure access can best be understood by reference to FIG. 2, which depicts the sequence of interactions that occurs among a mobile wireless communication device, say mobile terminal $140_n$, the public WLAN 115, Authentication server $150_n$. When configured with the IEEE 802.1x protocols, the access point $130_n$ of FIG. 1 maintains a controlled port and an un-controlled port, through which the access point exchanges information, with the mobile terminals $140_n$. The controlled port maintained by the access point $130_n$ serves as the entryway for non-authentication information, such as data traffic, to pass through the access point between the WLAN 115 and the mobile terminals $140_n$. Ordinarily, the access point $130_{-n}$ keeps the respective controlled port closed in accordance with the IEEE 802.1x protocol until authentication of the mobile wireless communications device. The access points $130_n$ always maintains the respective uncontrolled port open to permit the mobile terminals $140_n$ to exchange authentication data with the local survey or virtual server $150_n$.

Figure 2:
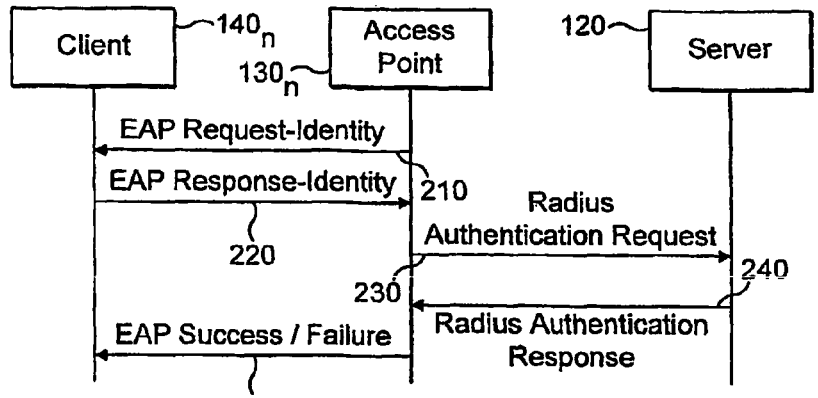
FIG. 2 is a flow diagram of the method of the authentication sequence of present invention.

With reference to FIG. 2, a further embodiment of the present invention is the utilization of the access point $130_n$ to create several operational states. Following an EAP Response-Identity packet 220 a state 1x_progress 340 indicates that the mobile terminal $140_n$ is an IEEE 802.1x client and the 802.1x authentication process is ongoing. Such means to select from one or more available security protocols is well known by those skilled in the art of programming and engineering in a WLAN environment. The 802.1x engine 325 is therefore responsible for client detection and providing the client capability information to other modules of the system. In addition it also implements RADIUS client functionality to convert EAP messages to RADIUS messages, forwarding such messages in the form of an radius access request 230 and responding to radius access reject messages 240. The packet filter module 330 is responsible for filtering packets based on the criteria set by other modules. The method utilized by the access point to determines that the terminal is not IEEE 802.1x protocol compliant is based upon timing out a pre-established timer, before it receives the EAP request identity response packet.

Figure 3:
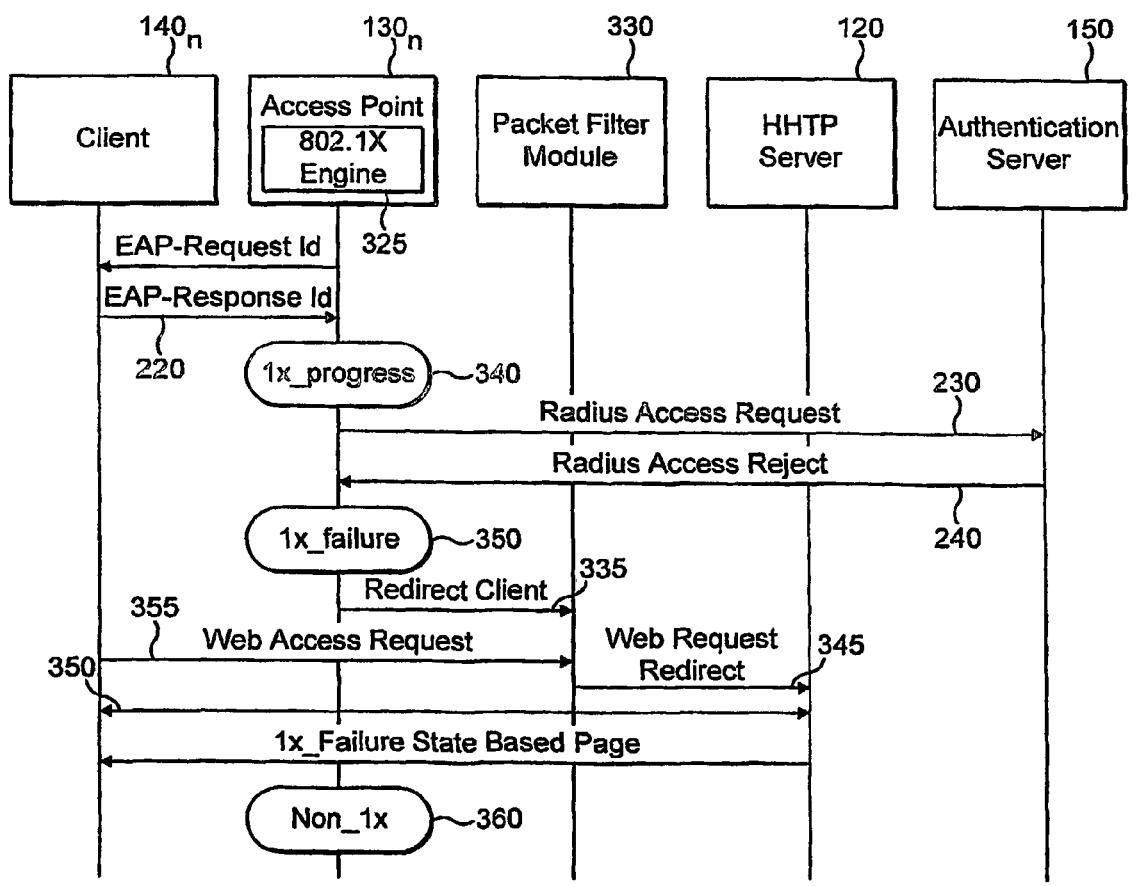
FIG. 3 is a flow diagram of the method of the present invention illustrating an authentication failure.

More particularly, FIG. 3 illustrates an embodiment of the method of the present invention wherein the access point $130_n$ detects that the mobile terminal $140_n$ is not an authenticated IEEE 802.1x client, and redirects client 335 to thereby configure through an IP packet filter module 330 a redirect to the HTTP server 120 via a web request redirect 345. Alternatively, mobile terminal $140_n$ may send a direct web access request 355, which is redirected by the packet filter module 330 to the HTTP server 120. The HTTP server 120 responds with information 350 specifically related to the browser based authentication.

In the case where the access point $130_n$ detects that the terminal device is an IEEE 802.1x client, it permits normal IEEE 802.1x protocol communication exchanges to proceed through the access point $130_n$ and sets up appropriate IP packet filtering through IP filter module 330 and state information for the HTTP server 120 to control the mobile terminal $140_n$ user access during and after IEEE 802.1x based authentication process.

As indicated above, the WLAN 115 system must maintain proper state information for the system to function properly. Such state information will be provided by the access point $130_n$ 802.1x engine, which is used by, among other things, the packet filtering function 330 and the HTTP server 120. With reference to FIG. 3, a further embodiment of the present invention is the utilization of the access point $130_n$ 802.1x engine to create several operational states. Following a Response-Identity EAP packet 220 a state 1x_progress 340 indicates that the mobile terminal $140_n$ is an IEEE 802.1x client and the 802.1x authentication process is ongoing. Following a Response-Identity EAP packet 220 a state 1x_failure 350 would indicate that the 802.1x authentication process failed for one of more reasons, not pertinent to the invention herein. Following a Response-Identity EAP packet 220 a state non_1x 360 would indicate that the mobile terminal $140_n$ is a non-IEEE 802.1x client. Because for such a client, all access controls are done at the higher layers, no further classification of state is necessary.

The access point includes an 802.1x engine 325, which is a module that implements the IEEE 802.1x protocol with the determining means necessary to carry out the steps of the invention. Such means to select from one or more available security protocols is well known by those skilled in the art of programming and engineering in a WLAN environment. The 802.1x engine 325 is therefore responsible for client detection and providing the client capability information to other modules of the system. In addition it also implements RADIUS client functionality to convert EAP messages to RADIUS messages. The packet filter module 330 is responsible for filtering packets based on the criteria set by other modules.

Figure 4:
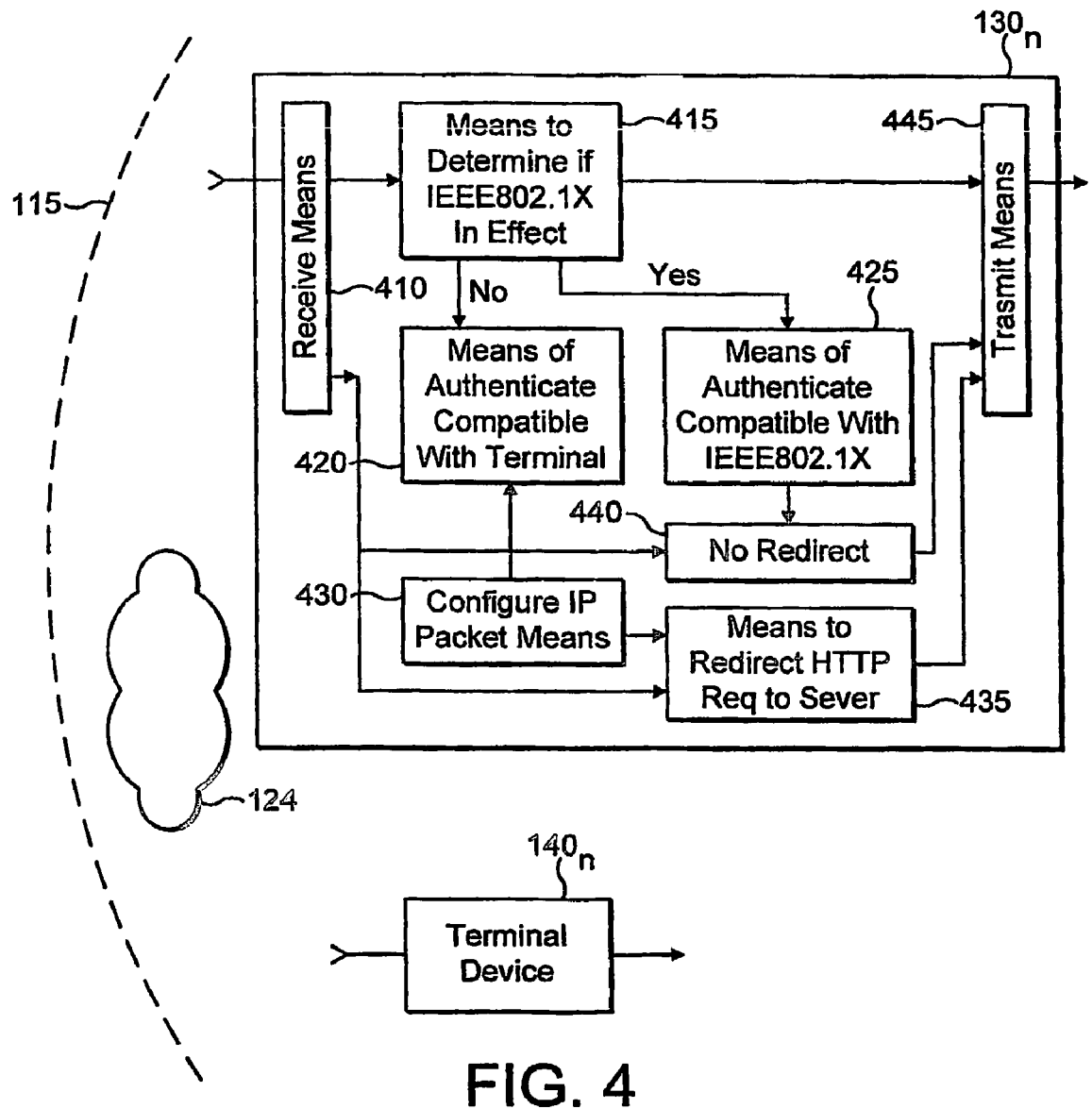
FIG. 4 is a block diagram of an apparatus for implementing the present invention.

Referring to FIG. 4 is an apparatus of the present the invention for improving the security of the terminal device $140_n$ in the WLAN 115 environment. The access point $130_n$ maintains communication with the terminal device $140_n$ terminal device and utilizes a means 415 to determine whether the terminal device $140_n$ utilizes an IEEE 802.1x protocol and if the terminal $140_n$ does not utilize said protocol then the access point $130_n$ employs an authentication means 420 compatible with the terminal device $140_n$ otherwise the access point employs an IEEE 802.1x protocol utilizing means 425. The access point $130_n$ means to determine includes communicating to the terminal device $140_n$ a Request-Identity EAP packet and if the mobile terminal $140_n$ utilizes the IEEE 802.1x protocol the access point $130_n$ receives a Response-Identity EAP packet. The access point $130_n$ further comprises the means 430 to configure an IP packet filtering to redirect through means 435 the device HTTP request to a local server if the terminal device $140_n$ does not utilize the protocol. In the event the IEEE 802.1x protocol is utilized then the means 425 utilizes means 440 to insure that the communication is not redirected.

In a further embodiment of the apparatus, the access point includes a means to communicate IEEE 802.1x protocol exchanges and means to establish IP packet filtering through an IP filter module and state information for the HTTP server to control the terminal device access during and after IEEE 802.1x based authentication process if the access point detects that the terminal device is an IEEE 802.1x client.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

The invention claimed is:

1. A method for controlling user terminal access to a wireless local area network, comprising the steps of:
   receiving from a user terminal a request to access the wireless local area network;
   transmitting to the user terminal an identity request message;
   receiving from the user terminal a response to the identity request message;
   determining whether the user terminal is IEEE 802.1x compliant in response to the response to the identity request message;
   selecting an authenticating mechanism utilizing IEEE 802.1x if said user terminal is IEEE 802.1x compliant;
   selecting an authentication mechanism, compatible with the user terminal, in response to a determination that the user terminal is not IEEE 802.1x compliant, for allowing user terminal access to the wireless local area network; and
   if the user terminal is not IEEE 802.1x compliant, redirecting an authentication request to an HTTP server for utilizing a browser based authentication protocol.

2. The method according to claim 1, further comprising the steps of, if the user terminal is IEEE 802.1x compliant, transmitting an authentication request to an authentication server and receiving an authentication response utilizing IEEE 802.1x protocol, and controlling user terminal access to the wireless local area network in response to the authentication response.

3. The method according to claim 1, further comprising the step of configuring a packet filtering module to redirect the authentication request to the HTTP server.

4. The method according to claim 3, further comprising the step of maintaining state information in the wireless local area network for use by the packet filtering module and the HTTP server.

5. The method according to claim 4, wherein the state information includes one of a first state indicative of ongoing authentication process, a second state indicative of authentication failure, a third state indicative of authentication success, and a fourth state indicative of a IEEE 802.1x noncompliant user terminal.

6. An access point in communication with a user terminal in a wireless local area network, comprising:
   means to determine if the user terminal utilizes an IEEE 802.1x protocol;
   means for employing the IEEE 802.1x. protocol in said access point, if said user terminal utilizes the IEEE 802.1x. protocol; and,
   means for employing an authentication means compatible with the user terminal if the user terminal employs a protocol other than the IEEE 802.1x protocol;
   wherein the means to determine includes means for communicating to the user terminal a Request-Identity extensible authentication protocol packet and if the user terminal utilizes the IEEE 802.1x protocol the access point receives a Response-Identity extensible authentication protocol packet.

7. The access point in claim 6, further comprises means to configure an internet protocol packet filtering means to redirect the user terminal request to a local server if the user terminal does not utilize said IEEE 802.1x protocol.

8. The access point in claim 6, further comprises means to communicate IEEE 802.1x protocol exchanges and means to establish internet protocol packet filtering through an internet protocol packet filter means and state information to control the user terminal access during and after an IEEE 802.1x based authentication process if the access point detects that the user terminal is IEEE 802.1x protocol compliant.

9. A method for controlling access by a user terminal in a wireless local area network by determining whether the user terminal utilizes an IEEE 802.1x protocol comprising the steps of:
   an access point communicating to the user terminal a request to identify, and if the user terminal utilizes an IEEE 802.1x protocol, acknowledging the request to identify, otherwise the access point determining that the user terminal is not IEEE 802.1x compliant and selecting an authentication mechanism compatible with the user terminal;
   wherein the access point determines that the user terminal is not IEEE 802.1x compliant when it does not receive an extensible authentication protocol identity response packet after a timeout value.

10. The method according to claim 9, further comprising the step of the access point detecting that if the user terminal is not IEEE 802.1x compliant, then configuring an internet protocol packet filter and redirecting a user request to a local server.

11. The method according to claim 9, further comprising the step of the access point transitioning to a state corresponding to browser based authentication protocol if the user terminal is not IEEE 802.1x compliant.

12. The method according to claim 10, further comprising the step of the local server communicating to the user terminal information specifically related to a browser based authentication protocol.

13. The method according to claim 12, further comprising the step of the access point transitioning to a state, if the user terminal utilizes the IEEE 802.1x protocol, that indicates that the user terminal is IEEE 802.1x compliant and thereafter processing all communication utilizing the IEEE 802.1x protocol.

14. The method according to claim 12, further comprising the step of the access point transitioning to a state corresponding to browser based authentication protocol if authentication fails.

15. A method for controlling access of a user terminal in a wireless local area network by determining whether the user terminal utilizes an IEEE 802.1x protocol, comprising the steps of:
   communicating through an access point to the user terminal a request to identify, and if the user terminal utilizes an IEEE 802.1x protocol, acknowledging the request to identify, otherwise determining by the access point that the user terminal is not IEEE 802.1x compliant, selecting an authentication mechanism compatible with the user terminal, detecting in the access point if the user terminal is not IEEE 802.1x compliant, then configuring an internet protocol packet filter means, and redirecting a user request to a local server.

16. The method according to claim 15, further comprising the step of determining in the access point that the user terminal is not IEEE 802.1x compliant if the user terminal does not receive an extensible authentication protocol identity response packet after a preset time.

17. The method according to claim 15, further comprising the step of communicating from the local server to the user terminal, information specifically related to a browser based authentication protocol.

18. The method according to claim 15, further comprising the step of transitioning to a state, in the access point if the user terminal utilizes the IEEE 802.1x protocol, that indicates that the user terminal is IEEE 802.1x compliant and thereafter processing all communication utilizing the IEEE 802.1x protocol.

19. The method according to claim 15, further comprising the step of transitioning to a state in the access point corresponding to browser based authentication protocol if the user terminal is not IEEE 802.1x compliant.

20. The method according to claim 18, further comprising the step of transitioning to the state in the access point corresponding to browser based authentication protocol if authentication fails.

* * * * *